United States Patent [19]

Nakajima

[11] Patent Number: 4,546,128

[45] Date of Patent: Oct. 8, 1985

[54] COMPOSITE MATERIAL COMPOSITIONS USING WASTE SYNTHETIC FIBER

[75] Inventor: Yoshikazu Nakajima, Musashimurayama, Japan

[73] Assignee: Kabushiki Kaisha Mikuni Seisakusho, Musashimurayama, Japan

[21] Appl. No.: 608,359

[22] Filed: May 9, 1984

[30] Foreign Application Priority Data

May 13, 1983 [JP] Japan .................................. 58-82767

[51] Int. Cl.$^4$ ............................................. C08F 29/10
[52] U.S. Cl. .................................... 523/222; 428/327; 525/935
[58] Field of Search ....................... 523/222; 428/327; 525/935

[56] References Cited

U.S. PATENT DOCUMENTS

| | | | |
|---|---|---|---|
| 2,015,711 | 10/1935 | Cherry ................................. | 523/222 |
| 2,378,477 | 6/1945 | Hanley ................................. | 523/222 |
| 2,527,628 | 10/1950 | Francis, Jr. ...................... | 523/222 X |
| 3,558,591 | 1/1971 | Yendrek et al. ................. | 525/935 X |
| 4,382,108 | 5/1983 | Carroll et al. ................... | 428/327 X |

FOREIGN PATENT DOCUMENTS

| | | | |
|---|---|---|---|
| 2357886 | 5/1974 | Fed. Rep. of Germany ...... | 523/222 |
| 115050 | 4/1942 | United Kingdom ................ | 523/222 |

*Primary Examiner*—George F. Lesmes
*Assistant Examiner*—Nancy A. B. Swisher
*Attorney, Agent, or Firm*—C. O. Marshall, Jr.

[57] ABSTRACT

The present invention provides composite material compositions using waste synthetic fiber released from fiber-related factories or general households. In an embodiment of the present invention, a thermoplastic synthetic resin may be incorporated with plasticizer(s), lubricant(s), and other additive(s), the mixture being molten and then kneaded with waste synthetic fiber which had been fibrillated into filaments, whereby said waste synthetic fiber is impregnated with the molten resin liquid to form a composite material composition. The present invention can thus provide inexpensive composite material compositions having excellent mechanical properties by making use of waste synthetic fiber which has been junked as waste so far, and lessening the rate of use of synthetic resins.

1 Claim, No Drawings

COMPOSITE MATERIAL COMPOSITIONS USING WASTE SYNTHETIC FIBER

BACKGROUND OF THE INVENTION

1. Field of the Invention

The present invention relates to a technique of re-utilizing waste synthetic fiber and particularly to a composite material composition obtained by first crushing waste synthetic fiber without any pretreatment, subsequently opening said waste synthetic fiber into filaments, and then impregnating the filaments with a thermoplastic synthetic resin followed by kneading.

2. Description of Prior Art

Heretofore, great efforts have been made, for example, in the manufacture of interior parts of automobiles, to utilize the supply of inexpensive products so long as they do not affect mechanical properties, not to mention the effort to satisfy the required mechanical properties for them. It is for this purpose that not an expensive synthetic resin alone but a mixture of said synthetic resin with a variety of other materials is used for the reduction of material cost. In that case, it is preferred to utilize wastes to which little importance has usually been attached as mixing material, from the viewpoint not only of the cost reduction but also of the re-utilization of natural resources.

More particularly, thermoplastic synthetic resins are disadvantageous as compared with metals in their stiffness, heat resistance, dimensional stability, and flame retardancy, so that inorganic fillers have been incorporated with said resins to overcome these defects, and fibrous fillers to improve mechanical properties. Glass fiber, wood flour, and wastepaper have been principally used as said fibrous fillers.

Among these conventional fibrous fillers, the unit price per volume of glass fiber is not so inexpensive because of its high specific gravity, which results in high specific gravity of the obtained composite material in which glass fiber has been incorporated. Although composite materials obtained by the incorporation of wood flour or wastepaper in thermoplastic synthetic resins are excellent in physical properties because of its fiber-reinforcement effect, the incorporation does not result in sufficient reinforcement because the strength of the filament is only slightly higher than that of the resin and the fibers are likely to be cut in the step of kneading or processing during the manufacture.

In the conventional technique of reinforcement with fillers, synthetic fibers such as unused polyester or polyamide have been little thought of as reinforcing agent. Moreover, synthetic fiber generated as used waste fiber has been burnt as valueless waste, or reused as felt material, at the best, after being opened together with other vegetable fibers.

SUMMARY OF THE INVENTION

An object of the present invention is to re-utilize waste synthetic fiber generated in spinneries, dye works, and sewing factories but ignored as industrial wastes, or released from general households as old clothes so as to contribute to effective utilization of resources and at the same time to reduce the rate of use of synthetic resins as petroleum derivatives, and further to provide inexpensive composite materials with all of the mechanical strengths being superior to those of a matrix synthetic resin.

In order to attain these objects, the composite material composition according to the present invention is constituted by incorporating plasticizer(s), lubricant(s), or other additives with about 70 to 160 parts by weight of a thermoplastic synthetic resin, melting the mixture, and kneading the mixture in the molten liquid phase with 100 parts by weight of waste synthetic fibers which has been opened into single filaments to impregnate said waste synthetic fiber with the molten resin liquid.

DESCRIPTION OF THE PREFERRED EMBODIMENTS

The composite material composition according to the present invention substantially comprises 100 parts by weight of waste synthetic fiber to which about 70 to 160 parts by weight of thermoplastic synthetic resin has been added.

The waste synthetic fiber to be used herein includes, for example, polyester and polyamide fibers and blended, union, or coknitted fabrics thereof. The shape of the waste synthetic fiber may be any of yarn, woven, knitted, or non-woven fabric. They can be used without any pretreatment such as washing or drying. The waste fiber, therefore, in its use, may naturally be contaminated with dyes, pigments, fiber-treatment agents, finishing agents, and the like. It also contains moisture of about 0.5 to 5% in its equilibrium state.

Since waste synthetic fiber with a large size requires much time for mixing and impregnating with the thermoplastic synthetic resin, it is advisable from the viewpoint of the molding characteristics of the final composite material that the waste fiber be crushed into small pieces with a filament length of 0.5 to 10 mm, preferably around 5 mm, and then mixed and impregnated with the thermoplastic synthetic resin to form a composite material composition.

The thermoplastic synthetic resin to be used here includes polyethylene, polypropylene, ethylene/propylene copolymer, polybutene, polyvinyl chloride, styrene, ABS, and polyacetal. These thermoplastic synthetic resins may be used alone, or some of them may be selected and used in combination for imparting the properties that suit the intended use of the final moldings containing the composite material composition. Anyway, the mixing ratio of the thermoplastic synthetic resin is within the range of about 70 to 160 parts by weight per 100 parts by weight of the waste synthetic fiber.

Synthetic rubber or thermoplastic elastomer may be added to further improve the physical properties, for example impact strength, required of the moldings. Moreover, addition of talc or other inorganic fillers can improve the bending modulus of elasticity of the moldings. Plasticizers and lubricants may be blended to improve the kneadability of the waste synthetic fiber with the thermoplastic synthetic resin and other additives.

The outline of the process for the preparation of the composite material composition according to the present invention will now be described. First, waste synthetic fiber is crushed into small pieces with a size of 50 mm or less, and further cut into pieces with a size of 10 mm or less with a turbo-cutter so that the waste synthetic fiber can be mixed with the thermoplastic synthetic resin efficiently. Such crushing of waste fiber may be effected in various ways. For example, waste fiber is first cut longitudinally and crosswise with a cutter and then the thus cut fiber is crushed with a turbo-cutter. Crushed fiber pieces can be obtained at high efficiency by this method. A turbo-mill is then used to further open the crushed fiber pieces into filaments, because strongly twisted yarn cannot be fully opened if it has a size of 10 mm or more after it was cut with a turbo-cutter.

The thus crushed pieces of waste synthetic fiber are mixed with a thermoplastic synthetic resin and other additive(s) (hereinafter generically referred to as the materials) and then agitated at a high speed in a mixer, whereby not only the materials are mixed up well but the temperature of the materials is raised because of the frictional heat generated during the mixing. By dint of this frictional heat, the materials are dried so that the moisture content of the waste synthetic fiber is 0.5% or less. As high-speed agitation of the materials is further continued, the temperature in the mixer is raised to a melting temperature of the thermoplastic synthetic resin contained in the materials, whereupon the thermoplastic synthetic resin begins to melt and weld on the surface of the fiber in the same materials.

However, if the high-speed agitation of the materials in the mixer is further continued, the material temperature is elevated so high as to deteriorate the mechanical strength characteristic of polyester or polyamide fiber. Too prolonged agitation, sometimes, even causes breakage of the fiber, which results in the lowering in the mechanical strength of the final composite material composition products. The same is true for the thermoplastic synthetic resin: too much elevation in the material temperature may result in the deterioration in the thermoplastic synthetic resin and the decrease in the mechanical strength of the composite material composition. The temperature in the mixer, therefore, must be maintained at 200° C. or below, preferably 180° C. or below in order to obtain a composite material composition which is most excellent in mechanical strength. The viscosity of the molten synthetic resin must be considerably lowered for the sufficient welding of the synthetic resin to the fiber under such a temperature condition. The addition of a plasticizer is advisable for this purpose.

The materials which attained the above mentioned temperature are granulated by using a known granulator to form as final product a composite material composition using waste synthetic fiber according to the present invention.

A known molding means is used to apply this composite material composition for interior parts or the like.

The composition can be molded with, for example, an injection molding machine in the same way as that of an ordinary thermoplastic synthetic resin.

A preferred example of the process for the preparation of the composition will now be described.

Sewing clippings of blended yarn fabric for working wears, consisting of 65% polyester and 35% cotton were used as waste synthetic fiber in the present example. First, the waste synthetic fiber was cut into square pieces with a size of 50 mm×50 mm with a cutter, and then further crushed with a turbo-cutter until the pieces could pass a 5 mm×5 mm mesh screen. These pieces were then opened with a turbo-mill. 7 kg of the thus opened waste synthetic fiber was used in the process of the present example.

On the other hand, 11 kg of polypropylene resin as thermoplastic synthetic resin and 2 kg of calcium carbonate as inorganic filler were used.

These materials were supplied into a mixer which had been previously heated to 200° C., and then stirred therein at the rate of 1,740 r.p.m. continuously for about 15 minutes. When the temperature in the mixer reached 163° C., the thermoplastic synthetic resin began to melt. 10 minutes were required until such melting began since the stirring was started. This melting of the thermoplastic synthetic resin caused sharp increase in the viscosity of the materials, and the surface of the fiber began to be homogeneously covered with the molten resin. In this process, the load current of the mixer motor was around 55 A when drying the materials, but it began to increase with the start of melting of the thermoplastic resin, and when it reached 75 A, the material temperature was 180° C.

At this stage, the materials were transferred into another mixer which had been water-cooled to about 20° C. to effect additional stirring at the rate of 100 r.p.m. for 15 minutes, whereby a fibrous substance impregnated with the resin was obtained.

The obtained substance was granulated with a granulator at a temperature maintained at 190° C. or below. If the temperature exceeded 190° C., the fiber was broken.

As described above, the thus granulated composite material composition can be molded into, for example, interior parts with an injection molding machine.

The properties of the composite material compositions according to the present invention are summarized in the following table. It is understood from the table that the obtained composite material compositions have fully attained the objects of the present invention.

| | Item | Testing method | Unit | Reference Example 1 | Example 1 | Reference Example 2 | Example 2 | Reference Example 3 | Example 3 | Example 4 |
|---|---|---|---|---|---|---|---|---|---|---|
| Primary properties of substance | Density | JISK 7112 | g/cc | 0.90 | 1.11 | 0.95 | 1.15 | 1.04 | 1.20 | 1.12 |
| | MFR | JISK 6758 | g/10 min | 50 (230° C.) | 0.65 | 23 (190° C.) | 0.23 | 1.2 | 0.03 | |
| Mechanical properties | Length Tensile strength | JISK 7113 | kg/cm² | 260 | 323 | 270 | 304 | 360 | 419 | 300 |
| | Width | | | | | | | | | 191 |
| | Length Elongation | JISK 7113 | % | 40 | 7.9 | 200 | 6.5 | | 4.8 | 7.8 |
| | Width | | | | | | | | | 4.1 |
| | Bending modulus of elasticity | JISK 7203 | kg/cm² | 11000 | 26000 | 10000 | 23000 | 19000 | 32000 | 28000 22000 |
| | Izod impact strength | JISK 7110 | kg-cm/cm² | 6 | 6.6 | 3.5 | 3.7 | 38 | 3.6 | |
| | Surface hardness | JISK 7202 | R-Scale | 95 | 99 | 66 | 77 | 94 | 103 | |

-continued

| Item | | Testing method | Unit | Reference Example 1 | Example 1 | Reference Example 2 | Example 2 | Reference Example 3 | Example 3 | Example 4 |
|---|---|---|---|---|---|---|---|---|---|---|
| Thermal properties | Thermal deformation temp. | JISK 7207 | °C. | 95 | 144 | 60 | 99 | 96 | 96 | |
| Resin used | | | | Polypropylene | | Polyethylene | | ABS | | Polypropylene |

In the table, Example 1 shows the properties of the composite material composition obtained by the above-described method. Examples 2 and 3 show the properties of the compositions, respectively, containing polyethylene and ABS as thermoplastic synthetic resin. (Reference Examples 1, 2, and 3 show the properties of the thermoplastic synthetic resins used in each example) Example 4 shows the properties of a sheet prepared using the composite material composition obtained in Example 1 with an ordinary extruder.

What is claimed is:

1. A composite material suitable for injection molding comprising 100 parts by weight of waste polyester fiber in the form of separate filaments 0.5 to 10 mm. in length, intimately mixed and impregnated with 70 to 160 parts by weight of thermoplastic polypropylene resin.

* * * * *